(12) United States Patent
Hayden et al.

(10) Patent No.: US 9,133,818 B2
(45) Date of Patent: Sep. 15, 2015

(54) WIND TURBINE BLADE

(75) Inventors: Paul Trevor Hayden, Cowes (GB); Peter Anthony Broome, Cowes (GB)

(73) Assignee: Blade Dynamics Limited, Cowes, Isle of Wight (GB)

( * ) Notice: Subject to any disclaimer, the term of this patent is extended or adjusted under 35 U.S.C. 154(b) by 858 days.

(21) Appl. No.: 12/989,243

(22) PCT Filed: Apr. 24, 2009

(86) PCT No.: PCT/GB2009/001039
§ 371 (c)(1),
(2), (4) Date: Jan. 7, 2011

(87) PCT Pub. No.: WO2009/130467
PCT Pub. Date: Oct. 29, 2009

(65) Prior Publication Data
US 2011/0103962 A1      May 5, 2011

(30) Foreign Application Priority Data
Apr. 24, 2008   (GB) .................................. 0807515.2

(51) Int. Cl.
  *F03D 3/06*    (2006.01)
  *F03D 1/06*    (2006.01)

(52) U.S. Cl.
  CPC ........... *F03D 1/0675* (2013.01); *F05B 2230/60* (2013.01); *F05B 2240/30* (2013.01); *F05B 2240/40* (2013.01); *F05B 2250/70* (2013.01); *Y02E 10/721* (2013.01)

(58) Field of Classification Search
  CPC ................. F03D 3/06–3/068; F05B 2240/40; F05B 2250/70; F05B 2250/72; F05B 2250/73
  USPC ............. 416/226, 229 R, 232, 233, 240, 239, 416/223 R; 29/889.7, 889.72
  See application file for complete search history.

(56) References Cited

U.S. PATENT DOCUMENTS

| | | | |
|---|---|---|---|
| 3,400,904 A | | 9/1968 | Bede |
| 3,606,580 A | * | 9/1971 | Kaufman ...................... 416/232 |
| 4,295,790 A | | 10/1981 | Eggert, Jr. |
| 4,339,230 A | * | 7/1982 | Hill ............................... 416/226 |
| 4,739,954 A | * | 4/1988 | Hamilton ..................... 244/123.1 |
| 5,720,685 A | * | 2/1998 | Malone ......................... 474/190 |
| 6,237,873 B1 | * | 5/2001 | Amaoka et al. ............. 244/123.7 |
| 7,179,059 B2 | * | 2/2007 | Sorensen et al. ............. 416/226 |
| 2010/0172759 A1 | * | 7/2010 | Sullivan ......................... 416/41 |

FOREIGN PATENT DOCUMENTS

| | | |
|---|---|---|
| CN | 101149043 A | 3/2008 |
| EP | 1184566 A1 | 3/2002 |

(Continued)

OTHER PUBLICATIONS

International Search Report for International Patent Application No. PCT/GB2009/001039 dated May 8, 2010.

*Primary Examiner* — Nathaniel Wiehe
*Assistant Examiner* — Brian O Peters
(74) *Attorney, Agent, or Firm* — Patterson & Sheridan, LLP

(57) ABSTRACT

A wind turbine blade comprising an elongate spar (6). A first plurality of skin panels (1) are attached in an upper high pressure row to the spar to form a substantial proportion of the external profile of one surface of the blade. A second plurality of skin panels (1) are attached in a lower low pressure row to the spar to form a substantial proportion of the external profile of the opposite lower surface of the blade. A plurality of the skin panels in each row are each integrally provided with a bulkhead (2) which supports the skin panel on the spar.

15 Claims, 3 Drawing Sheets

(56) References Cited

FOREIGN PATENT DOCUMENTS

| EP | 1584817 | A1 | 10/2005 |
| EP | 1878915 | A2 | 1/2008 |
| GB | 630222 | A | 10/1949 |
| WO | 0146582 | A2 | 6/2001 |

\* cited by examiner

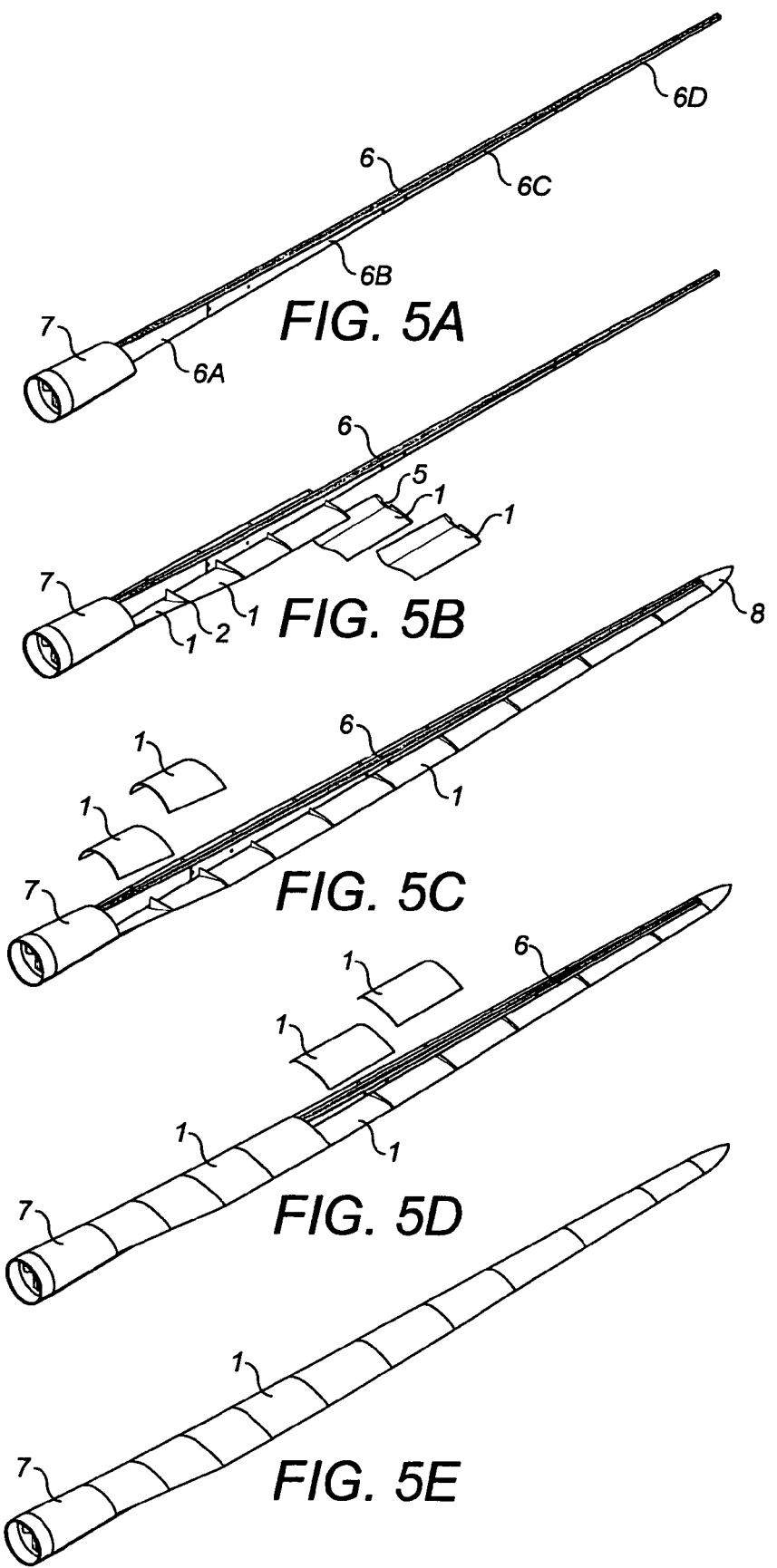

WIND TURBINE BLADE

The present invention relates to a wind turbine blade.

Typically wind turbine blades consist of a structural spar member surrounded by an aerodynamic shell fairing. This fairing is made in two halves, and then later bonded to the structural spar and the two halves joined together at both the leading and trailing edges. In other examples the wind turbine blade consists of two aerodynamic fairings which also contain structural material. These fairings are later bonded together on their leading and trailing edges as shear webs are also bonded in between the two halves to complete the structural section.

As blades get larger it becomes increasingly harder to construct large (i.e., greater than 30 m) aerodynamic fairings reliably and in any economic way. Additionally because of their size they become impossible to transport any large distance and so can only really be constructed close to the final wind farm site. This does not allow versatility in both manufacturing location and process which ultimately leads to lower manufacturing reliability and higher part costs.

In order to address this problem, it has been proposed to produce turbine blades which are assembled from a number of sections which are joined together end-to-end to form the finished blade. Such a design is known from EP 1 184 566 and also from our own WO 2009/034291 and WO 2009/034292.

Both designs have an elongate spar extending along substantially the entire length of the blade. A plurality of ribs are attached along the length of the spar and a plurality of skin panels are then attached over these ribs to define the profile of the blade. The ribs are shaped such that they fit with the internal profile of the skin panels thereby providing structural rigidity for the blade.

Also of relevance are WO 01/46582 and U.S. Pat. No. 4,295,790. These documents both disclose blades with an elongate spar, the upper and lower surfaces of which form part of the outer surface of the blade. The blade geometry is completed by leading and trailing edge segments which are attached to the front and back of the spar in order to form the completed blade.

The present invention is an improvement on these designs.

According to the present invention, the wind turbine blade comprises an elongate spar, a first plurality of skin panels attached in an upper high pressure row to the spar to form a substantial proportion of the external profile of one surface of the blade, a second plurality of skin panels attached in a lower low pressure row to the spar to form a substantial proportion of the external profile of the opposite lower surface of the blade, wherein a plurality of the skin panels in each row are each integrally provided with a bulkhead which supports the skin panel on the spar.

By forming the blade with upper and lower rows of skin panels with the supporting bulkheads integrally with the skin panels, the need for separate ribs is eliminated. This significantly reduces the number of components required to create a finished blade. Also, whereas previously it was necessary to ensure that the ribs were correctly aligned with respect to the spar and then to ensure that the skin panels were correctly aligned with respect to the ribs, as the relationship between the bulkheads and the skin panels is fixed prior to assembly, it is now only necessary to ensure that the panels are correctly aligned with respect to the spar. Thus, one alignment step is eliminated and the assembly process is therefore simplified.

The present invention also provides a significant benefit over the blades of WO 01/46582 and U.S. Pat. No. 4,295,790. The joints in the two prior art documents are as far as they can be from the neutral axis of the blade. On the other hand, with the present invention, the joint may be positioned at or closer to the neutral axis. This will significantly reduce the stresses which are applied to these edges.

The bulkhead may be positioned anywhere along the length of the skin panel. Indeed, there may be more than bulkhead per skin panel. However, preferably, each of the skin panels with a bulkhead has the bulkhead at one end and is supported at the opposite by an adjacent panel. Under these circumstances, each skin panel is preferably provided with a recess on its external face at the one end. This ensures that an adjacent skin panel can be supported in such a way that its external surface is flush with that of the adjacent panel.

In an alternative structure, each alternate skin panel may be provided with a bulkhead at both ends. A skin panel without any bulkheads may then fitted between and supported by each pair of adjacent skin panels with bulkheads.

Preferably, each bulkhead has a flange in the region facing the spar to provide a contact surface to the spar. This flange preferably extends across the full width of the bulkhead to provide a contact surface for a facing skin panel.

A surface treatment such as a self-adhesive polymer sheet may be attached to the skin panels. Preferably, this is done for individual skin panels prior to assembly, but it may also be done subsequent to the assembly.

The joints between the upper and lower rows at the leading and trailing edges may be exactly at the leading and trailing edges as this is the point at which they will experience lowest bending moments. However, the leading edge is a relatively high wear area and it is important to have a precisely defined trailing edge to reduce noise. For these reasons, the skin panel in the upper row is joined to an adjacent skin panel in the lower row at locations adjacent to, but not at, the leading and trailing edges.

The joints may be simple abutments which are adhered together. However, preferably, at a joint between adjacent panels in the upper and lower rows, one of the upper or lower rows is formed with a recess, and the end of the upper and lower rows fits into the recess such that it is supported in the recess in a manner in which the outer surfaces of the upper and lower panels are flush with one another in the vicinity of the joint. This facilitates the alignment of the upper and lower rows and also produces a joint in which the two rows are precisely aligned.

The present invention also extends to a skin panel for a wind turbine blade, the panel having an external face for forming the outer profile of the blade and a bulkhead at one end with an opening for attachment to a spar, the external face having a recess at the one end for supporting an adjacent panel. The panel may have any of the preferred features referred to above in the context of the blade.

The skin panels may be stackable for ease of storage and transportation. The longest main dimension of the panel (whether it is the length or the width) is preferably less than 12 m. This allows the panels to be transported in a standard container.

An example of a wind turbine blade and skin panel in accordance with the present invention will now be described with reference to the accompanying drawings, in which:

FIGS. 5A to 5E are perspective views showing various stages in the blade assembly process.

Figure 1:
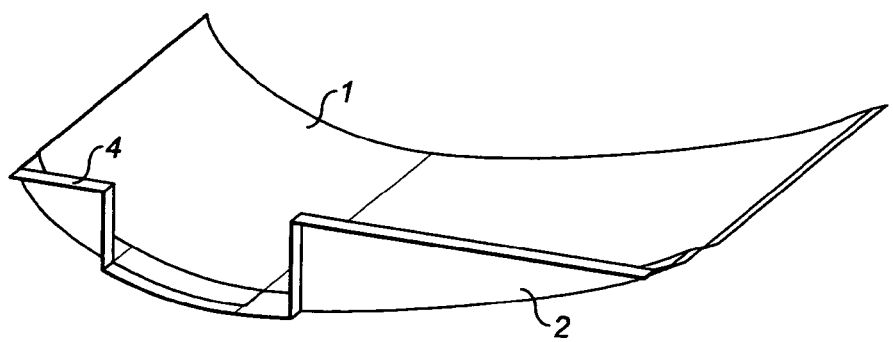
FIG. 1 is an inverted perspective view of the skin panel.
Figure 2:
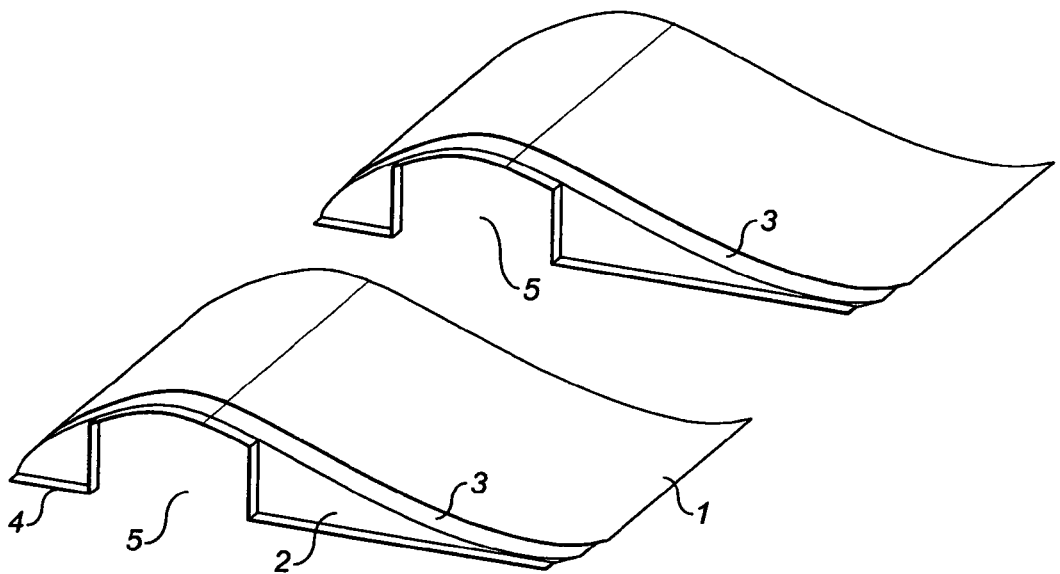
FIG. 2 is a perspective view of a pair of skin panels prior to assembly.
Figure 3:
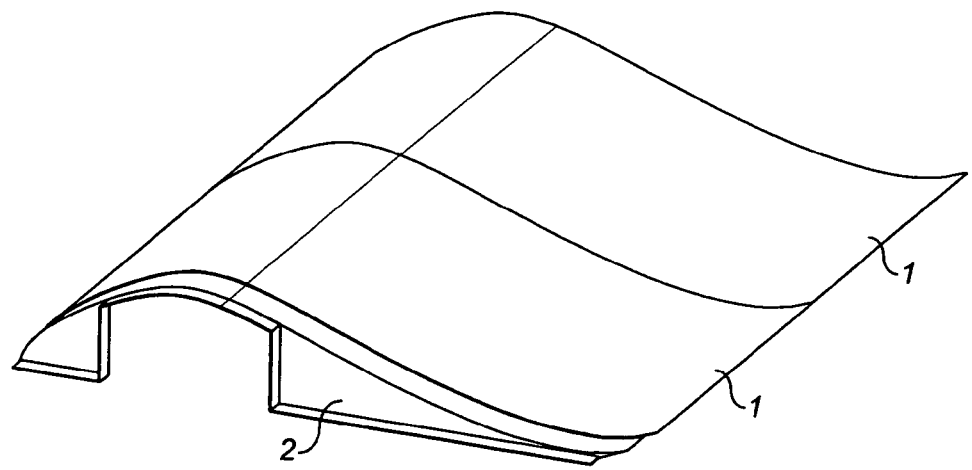
FIG. 3 is a view similar to FIG. 2 showing the skin panels together.

The skin panel is made up of a skin portion 1 and a bulkhead 2. The skin portion 1 has a profiled aerodynamic shape corresponding to a portion of half of a wind turbine blade. At the end closest to the tip of the finished blade, the skin portion is provided with a recess 3 which extends across the full width of the blade and is arranged to support an adjacent panel. The bulkhead 2 is positioned at the same end and extends across the full width of the internal face of the skin portion. A flange 4 extends across the internal surface of the bulkhead to provide a contact surface. The flange 2 is provided with an opening 5 to fit around the spar as described below.

Figure 4:
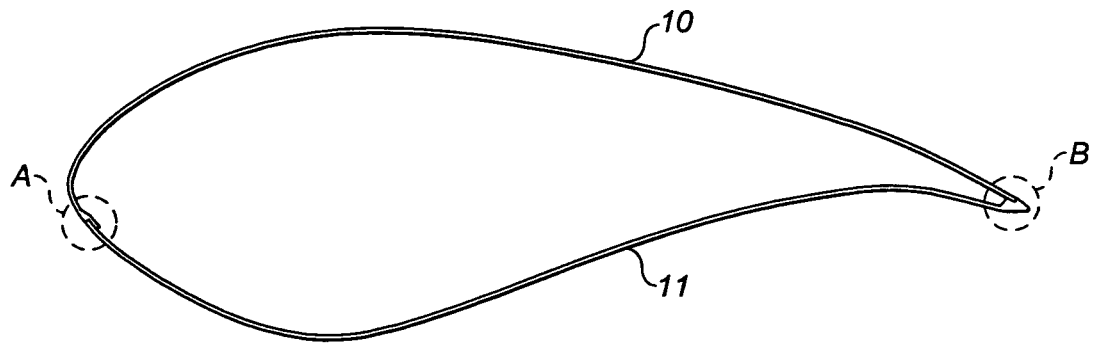
FIG. 4 is a cross-section showing an example of the leading and trailing edges.
Figure 4A:
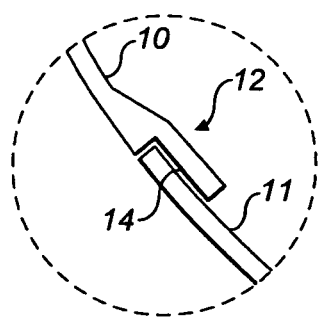
FIG. 4A shows the detail of the leading edge joint circled A in FIG. 4.
Figure 4B:
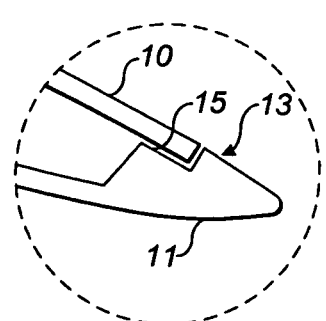
FIG. 4B shows the detail of the trailing edge joint circled by B in FIG. 4.

The leading and trailing edge joints are shown in FIGS. 4, 4A and 4B. An upper skin panel 10 and a lower skin panel 11 are joined at the leading edge joint 12 as shown in FIG. 4A and a trailing edge joint 13 as shown in FIG. 4B. At the leading edge, the upper panel 10 has a recess 14 which accommodates the edge of the lower panel 11 which is adhered in place so that the adjoining surfaces are flush with one another. The joint could be inverted such that the recess was on the lower panel 11. It will be noted from FIG. 4 that the joint is close to but not at the leading edge of the blade. The leading edge is on the neutral axis and is therefore subjected to the least bending moments. However, the leading edge is also typically a high wear area and, therefore, as a compromise, the leading edge joints are therefore positioned slightly away from the edge, for example within the 200 mm of the edge.

The rear edge joint 13 is similarly constructed in that a recess 15 in the lower panel 11 accommodates the edge of the upper panel 10 which is adhered in place. Again, the joint could be inverted so that the recess was in the upper panel 10. The joint is close to but not at the trailing edge. The reason this time is that precise configuration of the trailing edge is important, particularly for noise considerations. A more precise geometry can be provided by the arrangement shown in FIG. 4B, rather than attempting to achieve precise geometry which also includes a bond line. Again, a spacing of some 200 mm from the trailing edge is preferred.

The skin panels can be made from a number of materials such as fibre reinforced plastic, metals and wood.

Typically they are made from glass fibre reinforced plastic which utilises fibres which are placed in a +/−45 degree direction with respect to the longitudinal blade axis. The skin panels may also contain additional material such as PVC foam or honeycomb, or balsa wood or other laminate arrangement to prevent buckling of the thin skin panels.

The skin panels are typically between 2 m and 8 m in length when measured along the longitudinal axis of the blade. They have a weight of approximately 50 kg-200 kg so can easily be manipulated without the use of large overhead cranes.

The skin panels can be externally covered in polyurethane paint or polyester or epoxy gelcoat as per current art or could be covered in a self adhesive thermoplastic coating such as that described in GB 0805713.5 or U.S. Ser. No. 12/102,506. This could be carried out prior to assembly and the individual seams between the elements taped after assembly or the blade could be completely covered in thermoplastic coating after assembly.

The assembly of the blade will now be described with reference to FIGS. 4A and 4E.

FIG. 4A shows a sub-assembly of the spar 6 and root 7. The spar 6 may have a one-piece construction or may be assembled from a plurality of spar modules 6A, 6B, 6C and 6D.

Beginning at the root end, the skin panels 1 are attached to the spar with the flange 4 adjacent to opening 5 being bonded to the spar 6. The panel closest to the root end has a profile at its route end which matches the profile of the distal end of the root 7. The distal end of the root 7 may be provided with a recess similar to the recess 3 provided on the skin panels to ensure that the surface of the adjacent skin panel 1 is flush with the surface of the root 7. In the illustrated example the root has a tapered shape such that the distal end of the root 7 has a similar shape to the corresponding edge of the skin panels 1. However, if a more conventional circular root end is used, the panel adjacent to the root may be provided with a more complex shape to bridge the transition from the circular shape of the root to the aerodynamic cross-section of the remainder of the blade.

As shown in FIG. 4B, successive skin panels 1 are bonded to the spar 6. Four skin panels are shown bonded in place, while the next two panels to be attached are shown separately from the spar. The root end of each one is bonded to the recess 3 of an adjacent panel and the flange at the opposite end is bonded to the spar. As shown in FIG. 4C all of the panels for the lower surface are bonded in place. These decrease in cross-section towards the tip then terminate in a specially shaped tip section 8.

Once the lower surface is complete, the same process is repeated for the upper surface as shown in FIG. 4D. In this case, the flange 4 is bonded not only to the spar 6, but also to the corresponding flange of the facing panel. The complete blade is shown in FIG. 4E.

Alternative construction methods are possible. Rather than assembling the complete spar, assembling the complete lower surface and assembling the complete upper surface, it would also be possible to begin to start applying skin panels to the upper surface before all of the skin panels are attached to the lower surface. Also, the process of applying the skin panels may begin before the complete spar has been assembled. It would even be possible to manufacture a plurality of modules, each having one of the spar segments 6A-6D surrounded by a plurality of skin panels. These modules could then be assembled to form the complete blade.

Once all of the panels are in place, the surface may be treated if this has not been done prior to assembly. The seams between adjacent panels may also be treated, for example, by being taped. The adhesive tape may also be applied to the leading edge as is well known in the art.

The invention claimed is:

1. A method of assembling a wind turbine blade comprising:
   providing an elongate spar;
   attaching a first plurality of skin panels to the spar to form an external profile of only one surface of the blade; and
   thereafter, attaching a second plurality of skin panels to the spar to form an external profile of only an opposite surface of the blade;
   wherein each skin panel of at least one the first and second plurality of skin panels is provided with a bulkhead which supports the first and second plurality of skin panels on the spar.

2. A method of claim 1, wherein each skin panel of the at least one of the first and second plurality of skin panels has the bulkhead at one end and is supported at an opposite end by an adjacent panel.

3. The method according to claim 2, wherein each skin panel of the at least one of the first and second plurality of skin panels is provided with a recess on its external face at the one end to support an adjacent panel.

4. The method according to claim 1, wherein each bulkhead has a flange in a region facing the spar to provide a contact surface to the spar.

5. The method according to claim 1, wherein each of the first plurality of skin panels are joined to corresponding skin panels of the second plurality of skin panels at a location adjacent to, but not at, a leading edge of the wind turbine blade.

6. The method according to claim 1, wherein each of the first plurality of skin panels are joined to corresponding skin panels of the second plurality of skin panels at a location adjacent to, but not at, a trailing edge of the wind turbine blade.

7. The method according to claim 1, wherein at a joint between adjacent skin panels of the respective first and second plurality of skin panels, a first one of the adjacent skin panels is formed with a recess, and a second one of the adjacent skin panels includes an end that fits into the recess such that the second one of the adjacent skin panels is supported in the recess in a manner in which the outer surfaces of the adjacent panels are flush with one another in the vicinity of the joint.

8. The method according to claim 1, wherein the first and second plurality of skin panels fully enclose the spar along a portion of its length.

9. The method according to claim 1, wherein the first and second plurality of skin panels are stackable.

10. The method according to claim 1, wherein a longest dimension of a skin panel of the first plurality of skin panels or the second plurality of skin panels is less than 12 m.

11. The method of claim 1, wherein the bulkhead includes a non-circular opening to support and prevent rotation of each skin panel provided with the bulkhead relative to the spar.

12. The method of claim 1, wherein one surface of the blade is a lower surface and the opposite surface is an upper surface.

13. The method according to claim 1, wherein each of the first plurality of skin panels are joined to corresponding skin panels of the second plurality of skin panels at a first location adjacent to, but not at, a trailing edge of the wind turbine blade and at a second location adjacent to, but not at, a leading edge of the wind turbine blade.

14. The method according to claim 1, wherein each of the skin panels of both the first and second plurality of skin panels are provided with a bulkhead and each of the bulkheads extending from the first plurality of skin panels are joined with corresponding bulkheads extending from the second plurality of skin panels.

15. The method according to claim 1, wherein each skin panel of the first and second plurality of skin panels is provided with a bulkhead.

* * * * *